(12) United States Patent
Otogawa et al.

(10) Patent No.: US 7,943,019 B2
(45) Date of Patent: May 17, 2011

(54) INSOLUBLE ELECTRODE

(75) Inventors: Ryuichi Otogawa, Osaka (JP); Kumiko Ohara, Osaka (JP); Takashi Onishi, Amagasaki (JP)

(73) Assignee: Daiso Co., Ltd., Osaka-shi (JP)

( * ) Notice: Subject to any disclaimer, the term of this patent is extended or adjusted under 35 U.S.C. 154(b) by 784 days.

(21) Appl. No.: 11/794,625

(22) PCT Filed: Jan. 6, 2006

(86) PCT No.: PCT/JP2006/300050
§ 371 (c)(1),
(2), (4) Date: Jan. 22, 2008

(87) PCT Pub. No.: WO2006/073163
PCT Pub. Date: Jul. 13, 2006

(65) Prior Publication Data
US 2009/0272646 A1    Nov. 5, 2009

(30) Foreign Application Priority Data
Jan. 7, 2005   (JP) .................. 2005-003219

(51) Int. Cl.
C25B 11/04   (2006.01)
C25B 11/06   (2006.01)
C25B 11/08   (2006.01)

(52) U.S. Cl. .............. 204/290.12; 204/290.14

(58) Field of Classification Search ............ 204/290.01, 204/290.12, 290.13, 290.14
See application file for complete search history.

(56) References Cited

U.S. PATENT DOCUMENTS
3,926,773 A * 12/1975 Koziol et al. ............ 204/290.13

FOREIGN PATENT DOCUMENTS
| | | | |
|---|---|---|---|
| EP | 0407355 | * | 9/1991 |
| GB | 1352390 | * | 5/1974 |
| JP | 52 9633 | | 3/1977 |
| JP | 5 171483 | | 7/1993 |
| JP | 5 75840 | | 10/1993 |
| JP | 6 2194 | | 1/1994 |

* cited by examiner

Primary Examiner — Bruce F Bell
(74) Attorney, Agent, or Firm — Oblon, Spivak, McClelland, Maier & Neustadt, L.L.P.

(57) ABSTRACT

Provided is an economical long-life insoluble anode capable of maintaining an anode function stably for a long time even if it is used in a part where severe consumption occurs to generate a cathodizing phenomenon, and also capable of reducing the amount of an electrocatalyst used as much as possible. To realize this, on the surface of a metal substrate 10 composed of a titanium plate, a porous layer 20 including a sintered body of a spherical titanium powder is formed as a base layer. An electrocatalyst layer 30 is formed from the surface of the porous layer 20 to its inside. A part of the electrocatalyst penetrates into the porous layer 20, which provides an incomparably stronger anchor effect than the case of a blast treatment. Even when parts exposed from the porous layer 20 are peeled off and dropped off, the anode function is maintained by the electrocatalyst left in the porous layer 20.

8 Claims, 2 Drawing Sheets

INSOLUBLE ELECTRODE

TECHNICAL FIELD

The present invention relates to insoluble anodes used in an electrolytic process accompanying oxygen generation such as electroplating of steel plates.

BACKGROUND ART

As the insoluble anodes used in an electrolytic process of electroplating or the like, lead or a lead alloy has been conventionally used in most cases. However, there are problems such as environmental pollution by lead eluted from this lead based anode. Therefore, there have been developed clean insoluble anodes in place of the lead based anode, one example of which is an anode using valve metals, above all, a titanium based anode using titanium.

In the titanium based anode, the surface of an anode substrate comprising pure titanium or a titanium alloy (these are generically referred to as titanium) is covered in layers by an electrocatalyst comprising iridium oxide or the like. Since a pyrolysis method is used for covering this insoluble anode with the electrocatalyst, crack takes place in the electrocatalyst layer thus formed, so that the electrocatalyst layer tends to be peeled off. Further, even if not going far enough to peeling-off, the electrocatalyst layer floats from the surface of the anode substrate, and an anode function tends to be lost. Therefore, there is a fundamental problem of short anode life.

To solve the problem of lifetime in the titanium based anode, generally, the surface of an anode substrate is roughened beforehand by a blast treatment or an etching treatment, and through an anchor effect thereby generated, an electrocatalyst layer has been fixed rigidly to the surface of the substrate. Further, alternatively, it is proposed that a medium layer comprising a valve metal other than titanium, such as tantalum, is interposed between an anode substrate and an electrocatalyst layer (see Patent documents 1 and 2).

Patent document 1: JP-A-7-229000 (1995)
Patent document 2: JP-A-8-109490 (1996)

The lifetime of an anode is lengthened by these measures. However, due to an electrolytic process accompanying a cathodizing phenomenon of an anode, consumption of an anode at the parts where cathodizing occurs rapidly proceeds, and since the lifetime of the whole anode is determined by this partial consumption, the present situation is that the expected effect cannot be sufficiently obtained. The cathodizing phenomenon of an anode will be briefly explained below.

For example, in an electroplating line of a steel plate, in order to plate both surfaces of a steel plate, two pieces of anodes are placed opposite to each other, and a steel strip being a cathode passes between the anodes, thereby plating metal is deposited on both surfaces of the steel strip. Herein, regarding the width of the two pieces of anodes placed opposite to each other (size in a direction perpendicular to the traveling direction of steel strip), since there are various widths of steel strips passing therebetween, it is set to a maximum width of the steel strips. Hence, when a steel strip with a smaller width than the maximum width passes, electrodes will directly face each other at the side edges in both sides of the anodes. Further, when metal plating with different thicknesses in both surfaces of a steel plate is conducted, a potential difference occurs between the two pieces of anodes, and in an anode of a lower potential side, the side edges where electrodes face directly each other act as a cathode.

This is the cathodizing phenomenon of an anode, and in the side edges of the anode suffering from this phenomenon, consumption of the electrocatalyst proceeds rapidly compared to the center part facing a steel strip, and this rapid consumption of the electrocatalyst in the side edge dominates a lifetime of the whole anode.

In view of such situations, it is an important technical object regarding an insoluble anode to suppress local consumption of the electrocatalyst involved with the cathodizing phenomenon of an anode, and as a means for achieving the technical object, a layer thickness of the electrocatalyst is made thicker in a part causing the cathodizing phenomenon than in other parts (see Patent document 3).

Patent document 3: JP-A-10-287998 (1998)

To suppress local consumption of the electrocatalyst involved with the cathodizing phenomenon of an anode, it is effective to increase a layer thickness of an electrocatalyst layer. However, it cannot be said that a consumption-suppressing effect is sufficient for the degree of the increase. The reason is that, in spite of a good amount of electrocatalyst left on an anode substrate, the electrocatalyst floats from the surface of the substrate, or a passive layer is formed between both of them, often causing an anode function to be lost. Moreover, when the layer thickness of an electrocatalyst layer is increased, there are also problems that the peeling off and drop-off of the electrocatalyst become remarkable.

In addition thereto, an increase in layer thickness of an electrocatalyst layer accompanies a large increase in costs. Namely, the electrocatalyst layer is formed up to a predetermined layer thickness by repeating a so-called bake coating where an electrode covering liquid is applied and calcined. To increase the layer thickness, it is necessary to increase the repeating number of the bake coating, which leads not only to an increase in the amount of expensive electrocatalysts used but also to a marked increase in the number of processes.

Further, when a lifetime of an anode is intended to extend, there have been many instances that electrocatalysts are improved, but the effect has been small for the lot of costs.

As described above, it has been desired to develop an economical long-life insoluble anode capable of maintaining an anode function stably for a long time when it is used at a part where the cathodizing phenomenon of an anode is caused, and also capable of reducing the amount of electrocatalysts used as much as possible.

DISCLOSURE OF THE INVENTION

Problems to be Solved by the Invention

It is an object of the present invention to provide an economical long-life insoluble anode capable of maintaining an anode function stably for a long time even when it is used at a part where severe consumption occurs due to cathodizing such as the side edges of an anode for electroplating, and also capable of reducing the amount of electrocatalysts used as much as possible.

Means for Solving the Problems

The present inventors have continued studying on a sintered body of a gas atomized spherical titanium powder, and as one of the achievements, have found the knowledge that the sintered body shows an excellent property as a porous electroconductive plate for a current collector in a proton-exchange membrane fuel cell.

The gas atomized spherical titanium powders are powders of titanium or a titanium alloy produced by a gas atomizing method, and each particle has a spherical shape with a smooth surface since it is produced by solidification during flying of melt droplets of titanium or the titanium alloy. The spherical titanium powders are excellent in flowability, and when they are charged into a container for sintering, they are filled up to a sufficient density without application of pressure. When they are sintered, there is produced an electroconductive thin porous plate with sufficient mechanical strength even when it has a large area.

One of the features of the porous body obtained by sintering spherical titanium powders is a relatively large porosity, and the porosity is easily adjusted by changing sintering temperatures or the like. Further, each pore has a relatively smooth shape surrounded by a spherical surface. The present inventors have thought that such feature of the spherical titanium powder sintered body is suitable for a base layer for an electrocatalyst layer on a titanium based anode, and studied from various perspectives on the production method and adequacy. As a result, noticeable facts have been made clear as follows.

Spherical titanium powders are laminated in layers on the surface of an anode substrate comprising titanium, and sintered in vacuum or under an inert gas atmosphere to form a porous sintered layer comprising spherical titanium powders on the surface of an anode substrate. When an electrocatalyst comprising iridium oxide and the like is coated on the surface of the sintered layer, a part of the electrocatalyst penetrates into each pore in the sintered layer, providing an incomparably stronger anchor effect than in the case of a blast treatment. As a result, there can be effectively prevented the peeling off and floating of an electrocatalyst layer from an anode substrate and further the formation of a passive layer between both of them. Namely, a large amount of the electrocatalyst is held stably. Further, a more distinguished feature is that an anode function is kept by the residual electrocatalyst penetrated in a porous layer even if the exposed part of the sintered porous layer is peeled off or dropped off. Thus, it becomes possible to lengthen a lifetime of an anode markedly.

A similar effect can be obtained, to a varying degree, by a porous sintered body of an irregular titanium powder or by a porous sintered body of a titanium fiber where a large amount of penetration of an electrocatalyst can be expected, and can also be obtained in the case where titanium is replaced with a valve metal other than titanium.

The insoluble anode of the present invention has been completed on the basis of the above knowledge, and it is a characteristic point in constitution that a porous layer comprising a valve metal is formed on the surface of an anode substrate comprising a valve metal, and an electrocatalyst layer is formed from the surface of the porous layer to its inside.

The valve metals are specifically titanium, tantalum, zirconium, niobium, tungsten or an alloy thereof, and titanium or its alloy (these are generically referred to as titanium) is preferable from the viewpoints of economy and the like. Namely, it is preferable from the viewpoints of economy and the like to form a porous sintered layer comprising titanium onto the surface of an anode substrate comprising titanium. However, it may become a highly economical anode depending on the kinds of valve metals when a sintered porous layer comprising a valve metal other than titanium is formed on the surface of an anode substrate comprising titanium. A sintered porous layer comprising tantalum is particularly preferable.

The shape and size of an anode substrate are suitably chosen in accordance with the shape and size of an insoluble anode to be produced.

A porous layer on the surface of a substrate can be formed by a sintered body of an irregular metal powder or a sintered body of a metal fiber as well as a sintered body of a spherical metal powder, however, a sintered body of a spherical metal powder is preferable from the viewpoints of permeability of an electrocatalyst and adhesion with an anode substrate, and a sintered body of a spherical metal powder produced by a gas atomizing method is particularly preferable.

The layer thickness of a porous layer is preferably 0.1 to 4.0 mm, particularly preferably 0.1 to 2.0 mm. When this layer thickness is too thin, durability of the porous layer and the amount of an electrocatalyst permeated are insufficient, so that an intended effect is hardly obtained. On the other hand, when this layer thickness is too thick, the amount of a sintering material used and the amount of an electrocatalyst penetrated increase more than necessary, deteriorating economic efficiency. The porous layer is also easily peeled off.

Porosity is important as another constituent element of a porous layer. This porosity is preferably 20 to 80%, and when a porous layer is a spherical metal powder sintered body, it is preferably 30 to 50%. When the porosity is too small, the amount of an electrocatalyst penetrated is insufficient, and an anode performance is lowered when the exposed part of the electrocatalyst layer is peeled off or dropped off. On the other hand, when the porosity becomes too large, the mechanical strength of an electrocatalyst layer is insufficient, and peeling off or the like from an anode substrate becomes remarkable.

In the case of a spherical metal powder, in particular a spherical titanium powder which are suitable for forming a porous layer, a porous layer will be further described. As described above, spherical titanium powders are excellent in flowability, and are sintered without application of pressure resulting in high strength. In the case of no pressurization, spherical titanium powders are sintered without changing the particle shape. In this way, it is a noticeable feature that spherical titanium powders can be sintered without application of pressure resulting in high strength without changing the particle shape, and according to such sintering without changing the particle shape so much, the porosity of a porous layer depends precisely on the particle diameter of the powder and sintering temperature, and when an average particle diameter is 20 to 200 µm, the porosity becomes suitable for a base layer for an electrocatalyst layer. From this viewpoint, the average particle diameter of the spherical titanium powder forming a porous layer is preferably 20 to 200 µm.

As a forming method of a porous layer, the general method is one that a spherical titanium powder is kneaded with a binder to prepare a slurry, the slurry prepared is applied on a titanium plate by a doctor blade method to form a green sheet, and then, degreased and sintered. It may be sintered in such a manner that not via a green sheet, a titanium plate acts as a setter, and a spherical titanium powder is filled thereon in a uniform thickness. In this case, it is possible to skip a preparation process and a degreasing process of a green sheet. In a method using a green sheet, although man-hour is large, there is a merit of capable of easily realizing uniformity of thickness of a sheet-like sintered body.

The conditions of the degreasing process and the sintering process may be as usual. For example, degreasing temperature is preferably 400 to 600° C. When the degreasing temperature is too low, there is a possibility that a binder is not completely separated, whereas when it is too high, there is a danger that sintering starts before completion of degreasing to break a sintered body by sudden gas generation from the binder. The degreasing time is preferably 1 hour or more, and when it is too short, there is a possibility that degreasing becomes insufficient. The sintering temperature is preferably 800 to 1400° C. When less than 800° C., sintering of a titanium powder becomes slow, whereas when more than 1400°

C., there arises a problem that the porosity of a sintered body is excessively lowered. As described above, it is possible to adjust porosity by changing sintering temperatures. The sintering time is preferably 1 hour or more, and when it is too short, there is a possibility that sintering becomes incomplete.

For a porous layer formed, it is preferable to conduct an etching treatment with oxalic acid or the like in order to roughen the surface of a particle and enhance adhesion with an electrocatalyst.

As the electrocatalyst, preferable are an oxide of platinum or a platinum group metal, or a mixture of the above with an oxide of a valve metal such as titanium, tantalum, niobium and zirconium. As a typical example, an iridium-tantalum mixed oxide and an iridium-titanium mixed oxide can be listed. The amount of the iridium oxide in these mixed oxides is 60 to 95% by weight in terms of metal, particularly preferably 60 to 90% by weight, and the amount of the valve metal oxide is 40 to 5% by weight in terms of metal, particularly preferably 40 to 10% by weight.

The amount of the electrocatalyst layer is preferably 10 to 500 $g/m^2$ being expressed as the covering amount per unit area of the electrocatalyst (reduced quantity of platinum group metal), more preferably 30 to 300 $g/m^2$, further, particularly preferably 50 to 200 $g/m^2$. When the covering amount of the electrocatalyst is small, the substance is absorbed in the under part of a porous layer upon coating, and a sufficient amount of the electrocatalyst is not covered on the surface of a porous layer, resulting in insufficient anode performance. On the other hand, when the covering amount of the electrocatalyst is too large, peeling off and drop-off become remarkable, an anode life in response to the covering amount is not ensured, and economic efficiency is deteriorated.

An anode life in an electrolysis process is evaluated by a positive current-carrying test (used as anode) and also by a positive/reverse current-carrying test (used as cathode in reverse current-carrying), and in the positive/reverse current-carrying test, durability of an anode against a cathodizing phenomenon is evaluated. When the covering amount of the electrocatalyst is increased step by step, an anode life in the positive current-carrying test is saturated at a relatively early stage, but an anode life in the positive/reverse current-carrying test is lengthened in response to the covering amount of the electrocatalyst. Namely, one of the meanings of increasing the covering amount of the electrocatalyst is life extension in the positive/reverse current-carrying test and improvement of durability against a cathodizing phenomenon. However, conventionally, even if the covering amount of the electrocatalyst is increased, peeling off or the like becomes remarkable, thus, there has been little meaning for an increase in the covering amount. However, when a porous sintered layer is used as a base layer, a relatively large amount of electrocatalyst can be held stably, and an anode life in the positive/reverse current-carrying test can be greatly extended. This point is also a characteristic effect of the insoluble anode of the present invention.

Effect of the Invention

The insoluble anode of the present invention, by an active substance covering structure where a porous layer comprising a sintered body of a valve metal is formed on the surface of a metal substrate comprising a valve metal and an electrocatalyst layer is formed from the surface of the porous layer to its inside, can maintain an anode function stably for a long time and extend an anode life greatly even being used, for example, at a part where severe consumption occurs. In particular, since the insoluble anode of the present invention can hold a relatively large amount of an electrocatalyst stably, it can largely improve a life characteristic and durability against a cathodizing phenomenon in the positive/reverse current-carrying test. Further, it is possible to exhibit an effect that is worth or more than the amount of the electrocatalyst used, the insoluble anode of the present invention is excellent in economic efficiency.

BEST MODE FOR CARRYING OUT THE INVENTION

Hereinafter, embodiments of the present invention will be described with reference to the drawings. FIG. 1 is a schematic sectional view of an insoluble anode showing an embodiment of the present invention, and FIG. 2 shows an enlarged schematic sectional view of the same insoluble anode.

The insoluble anode of the present invention is used in electroplating of both surfaces of a metal plate, for example, and is preferably used particularly at the side edges of both sides of the anode for electroplating where a cathodizing phenomenon occurs and its vicinity.

This insoluble anode has a porous layer 20 formed by a sintered body of a spherical titanium powder 21 on the surface of a metal substrate 10 composed of a titanium plate, and on the further surface thereof, has an electrocatalyst layer 30. The spherical titanium powder 21 is produced by a gas atomizing method, but may be produced by another method. The average particle diameter of the spherical titanium powder 21 is 20 to 200 μm. The spherical titanium powder 21 is sintered without application of pressure on the metal substrate 10 in a vacuum atmosphere or an inert gas atmosphere to form the porous layer 20. The porosity of the thus formed porous layer 20 is 30 to 50%.

The electrocatalyst layer 30 comprises a mixed oxide of iridium and tantalum, for example, and is formed from the surface of the porous layer 20 to its inside by repeating bake coating in which an electrode covering liquid is sintered after application. More specifically, this electrocatalyst is covered on the surface of the porous layer 20, penetrated into a pore 23 surrounded by the spherical titanium powder 21, and covered by each spherical titanium powder 21 composing the porous layer 20.

The electrocatalyst which is penetrated into the pore 23 of the porous layer 20 and covered the spherical titanium powder 21 with does not easily peel off and drop off, and it is in a large quantity as well. Hence, after the electrocatalyst exposed outside the porous layer 20 is peeled off and dropped off, it is left in the pore 23 of the porous layer 20 to maintain an anode function. The electrocatalyst exposed outside the porous layer 20 is also hardly peeled off and dropped off due to a strong anchor effect. Thereby, an anode life is remarkably extended even if the anode is used in a part where a cathodizing phenomenon of an anode occurs.

FIG. 3 is a schematic sectional view of an insoluble anode showing another embodiment of the present invention, and FIG. 4 shows an enlarged schematic sectional view of the same insoluble anode.

In the insoluble anode of the present embodiment, a porous layer 20 is formed of a sintered body comprising an irregular shaped titanium powder 22 such as a hydrogenation/dehydrogenation titanium powder. In this case, application of pressure is required upon forming or sintering, and this application of pressure makes the surface flat. Further, the porosity is adjusted to 20 to 80% by a pressurizing force and sintering temperature. This is the same embodiment as the above-described one in that the base of the porous layer 20 is an anode substrate 10 composed of a titanium plate, and the electrocatalyst layer 30 comprising a mixed oxide of iridium and tantalum is formed from the surface of the porous layer 20 to its inside.

EXAMPLES

Next, comparative testing between Examples of the present invention and Conventional examples will be explained, and the effects of the present invention are made clear.

As an anode substrate, 100 mm×100 mm×10 mm thickness of a titanium plate was prepared. Further, to form a porous layer comprising a sintered body, a gas atomized spherical titanium powder (commercial product) with an average particle diameter of 80 µm in a particle diameter range of 45 to 150 µm was prepared.

Polyvinyl butyral as a binder was dissolved in an organic solvent, a spherical titanium powder and a plasticizer were mixed therewith to produce a slurry. The produced slurry was coated on the surface of the titanium plate by a doctor blade method to form a green sheet of about 0.5 mm in thickness. Then, the titanium plate with the green sheet was subjected to a degreasing treatment in a vacuum atmosphere at 500° C. for 1 hour, thereafter, subjected to a sintering treatment at 1300° C. for 1 hour to form a titanium porous sintered layer of 0.5 mm thickness as a base layer onto the surface of the titanium plate. The porosity of the titanium porous sintered layer is 35%.

The base layer of the anode substrate thus obtained was subjected to an etching treatment with 10% oxalic acid (90° C. for 60 min), then, an electrode covering liquid whose composition is shown in Table 1 was prepared and coated thereto. After coating, the anode substrate was subjected to a drying treatment at 120° C. for 10 minutes, and sintered in an electric oven maintained at 500° C. for 20 minutes. By repeating this operation predetermined times, a titanium-based insoluble anode with iridium oxide as an electrocatalyst was produced. The weight ratio of the electrocatalyst layer is Ir/Ta=7/3.

TABLE 1

| | |
|---|---|
| $TaCl_5$ | 0.32 g |
| $H_2IrCl_6\ 6H_2O$ | 1.00 g |
| 35% HCl | 1.0 ml |
| $n-CH_3(CH_2)_3OH$ | 10.0 ml |

Then, this electrode was cut into 10×45×10 (thickness) mm, the electrode active part was eliminated leaving 10×10 mm of an effective electrode surface part. The test piece of the insoluble anode thus produced was subjected to an acceleration test of electrolytic life (positive current-carrying test). The test conditions adopted were as follows: 70° C., pH 1.46, 100 g/l $Na_2SO_4$ solution (sulfuric acid/acidic) as an electrolytic solution and a zirconium plate as a cathode. As a current condition, a current density of 300 A/dm² (constant) was adopted. A time until a cell voltage was increased by 5 V compared with that of the start of electrolysis was measured for an anode life.

Further, the insoluble anode with the same specifications was subjected to a positive/reverse current-carrying test. The test conditions adopted were as follows: 60° C., pH 1.2, 100 g/l $Na_2SO_4$ solution (sulfuric acid/acidic) as an electrolytic solution and a platinum plate as a cathode. As a current condition, every positive current-carryings at a current density of 200 A/dm² for 10 minutes, a reverse current with a current density of 5 A/dm² was applied for 10 minutes. A time until a cell voltage was increased by 5 V compared with that of the start of electrolysis was measured for an anode life.

For comparison, the surface of the foregoing titanium plate was subjected to a grid blast treatment under the condition of a pressure of 4 kg/cm² using an alumina grid for roughening. After the surface of this titanium plate was subjected to an oxalic acid etching treatment, an electrocatalyst layer was formed in the same manner as described above, an acceleration test of electrolytic life (positive current-carrying test and positive/reverse current-carrying test) was conducted. The test results are shown in Table 2.

TABLE 2

| | Anode specifications | | | Anode life (day) | |
|---|---|---|---|---|---|
| Classification | Substrate | Base treatment | Covering amount in terms of iridium metal | Positive current-carrying | Positive/Reverse current-carrying |
| Conventional example 1 | Ti plate | Blast | 50 g/m² | 73 | 25 |
| Conventional example 2 | Ti plate | Blast | 100 g/m² | 113 | 87 |
| Example 1 | Ti plate | Ti porous layer | 50 g/m² | 241 | 180 |
| Example 2 | Ti plate | Ti porous layer | 100 g/m² | 450 | 325 |

Two kinds of the covering amount of an electrocatalyst comprising iridium oxide and tantalum oxide were set out: an ordinary level (50 g/m² over the whole surface of electrode as iridium metal) and a thick coat considering a measure for the side edges of an anode where a cathodizing phenomenon occurs (100 g/m² over the whole surface of electrode as iridium metal). In a case of Conventional example where a blast treatment was conducted as a base treatment, when the covering amount of the electrocatalyst is an ordinary level (50 g/m² as iridium metal), the anode life is as short as 73 days in the positive current-carrying test, and the anode life is as extremely short as 25 days less than the foregoing in the positive/reverse current-carrying test. Such insoluble anode can hardly be used in a part where a cathodizing phenomenon occurs. By increasing the covering amount or the electrocatalyst to 100 g/m² (in terms of iridium metal), the anode life extends in the positive/reverse current-carrying test, but it is only 87 days. The anode life in the positive current-carrying test remains 113 days, being not very different from the case where the covering amount of the electrocatalyst is 50 g/m² (in terms of iridium metal).

In contrast to this, in Examples of the present invention where a base layer comprising a porous sintered body of a spherical titanium powder was formed, even when the covering amount of the electrocatalyst is in an ordinary level (50 g/m² as iridium metal), the anode life reaches 241 days in the positive current-carrying test, and the anode life is as long as 180 days in the positive/reverse current-carrying test. When the covering amount of the electrocatalyst is increased to 100 g/m² (in terms of iridium metal), the anode life in the positive current-carrying test is extended in response to the increase in amount of the electrocatalyst, reaching 450 days. The anode life in the positive/reverse current-carrying test is also extended in response to the increase in amount of the electrocatalyst, reaching 325 days.

In this manner, formation of a base layer comprising a porous sintered body of a spherical titanium powder is effective for extension of the anode life, above all, effective as a countermeasure against the consumption due to a cathodizing phenomenon.

DESCRIPTION OF THE SYMBOLS

Figure 1:
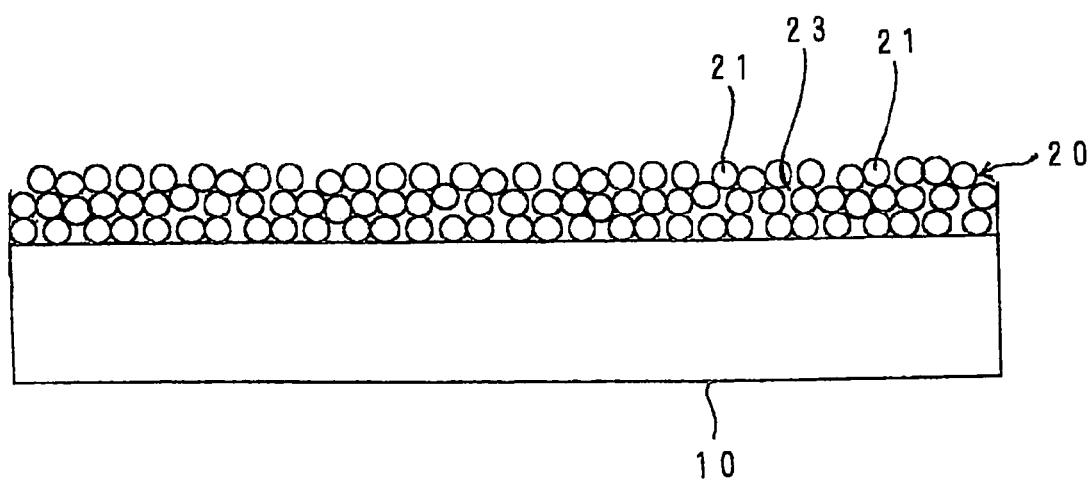
FIG. 1 is a schematic sectional view of an insoluble anode showing an embodiment of the present invention.
Figure 2:
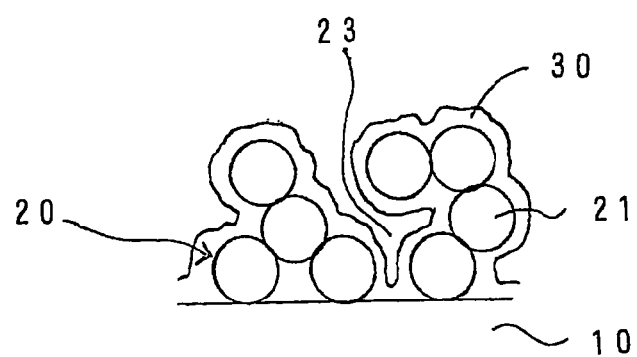
FIG. 2 shows an enlarged schematic sectional view of the same insoluble anode.
Figure 3:
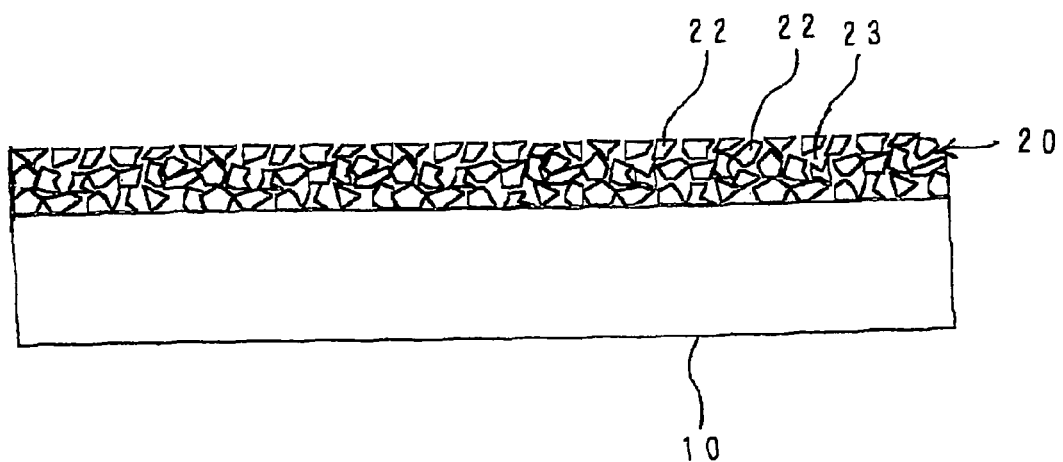
FIG. 3 is a schematic sectional view of an insoluble anode showing another embodiment of the present invention.
Figure 4:
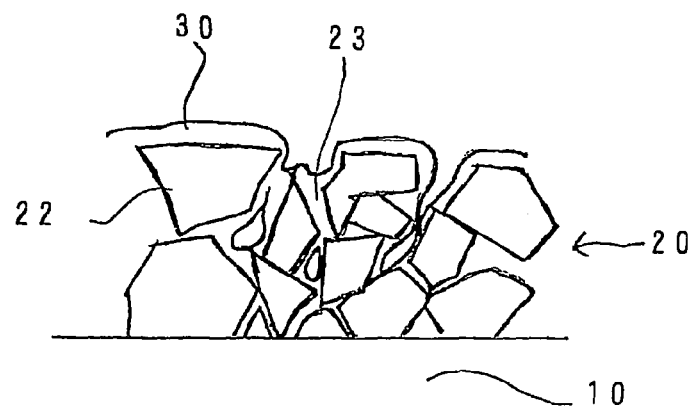
FIG. 4 shows an enlarged schematic sectional view of the same insoluble anode.

| | |
|---|---|
| 10 | Anode substrate |
| 20 | Porous layer |
| 21 | Spherical titanium powder |
| 22 | Irregular shaped titanium powder |
| 23 | Pore |
| 30 | Electrocatalyst layer |

The invention claimed is:

1. An insoluble anode comprising:
    a porous layer formed by laminating layers of a sintered body of spherical metal powder produced by sintering a valve metal in one of a vacuum and an inert atmosphere on a surface of the anode substrate,
    an electrocatalyst layer formed on the surface of said porous layer and penetrating pores of said porous layer.

2. The insoluble anode of claim 1, wherein said valve metal is selected from the group consisting of titanium, tantalum, zirconium, niobium, tungsten, and an alloy thereof.

3. The insoluble anode of claim 1, wherein said electrocatalyst layer comprises one of an oxide of platinum and a platinum group metal.

4. The insoluble anode of claim 1, wherein said electrocatalyst layer comprises one of an oxide of platinum and a platinum group metal, and an oxide of a valve metal.

5. The insoluble anode of claim 1, wherein the spherical metal powder is a spherical powder produced by a gas atomizing method.

6. The insoluble anode of claim 1, wherein the porous layer includes a pore surrounded by the spherical metal powder, and an electrocatalyst in the electrocatalyst layer is provided on the surface of the porous layer and penetrated into the pore.

7. The insoluble anode of claim 1, wherein the sintered body of the spherical metal powder has a porosity of 30 to 50%.

8. The insoluble anode of claim 1, wherein the spherical metal powder has an average particle diameter of 20 to 200 μm.

* * * * *